(12) United States Patent
Bauer

(10) Patent No.: US 11,192,214 B2
(45) Date of Patent: Dec. 7, 2021

(54) MACHINE TOOL HAVING A WORKPIECE CARRIER THAT IS DRIVEN ON ONE SIDE

(71) Applicant: Gebr. Heller Maschinenfabrik GmbH, Nürtingen (DE)

(72) Inventor: Gerhard Bauer, Frickenhausen (DE)

(73) Assignee: GEBR. HELLER MASCHINENFABRIK GMBH, Nürtingen (DE)

( * ) Notice: Subject to any disclaimer, the term of this patent is extended or adjusted under 35 U.S.C. 154(b) by 278 days.

(21) Appl. No.: 15/774,389

(22) PCT Filed: Oct. 18, 2016

(86) PCT No.: PCT/EP2016/074994
§ 371 (c)(1),
(2) Date: May 8, 2018

(87) PCT Pub. No.: WO2017/080760
PCT Pub. Date: May 18, 2017

(65) Prior Publication Data
US 2019/0193218 A1 Jun. 27, 2019

(30) Foreign Application Priority Data
Nov. 13, 2015 (DE) ...................... 10 2015 119 646.8

(51) Int. Cl.
*B23Q 1/01* (2006.01)
*B23Q 1/48* (2006.01)

(52) U.S. Cl.
CPC ........... *B23Q 1/017* (2013.01); *B23Q 1/4852* (2013.01)

(58) Field of Classification Search
CPC .......... B23Q 1/01; B23Q 1/015; B23Q 1/017; B23Q 1/0054; B23Q 1/25; B23Q 1/38;
(Continued)

(56) References Cited

U.S. PATENT DOCUMENTS 4,040,679 A * 8/1977 Teramachi ............... B23Q 1/40
384/45
4,358,198 A 11/1982 Moriyama et al.
(Continued)

FOREIGN PATENT DOCUMENTS

CN 2433045 Y 6/2001
DE 10061934 6/2002
(Continued)

OTHER PUBLICATIONS

National Intellectual Property Administration, P.R.C., First Office Action, Application No. 201680065343.3, dated Sep. 17, 2019, with English translation, 10 pages
(Continued)

*Primary Examiner* — Lee D Wilson
*Assistant Examiner* — Robert F Neibaur
(74) *Attorney, Agent, or Firm* — Cantor Colburn LLP

(57) ABSTRACT

The machine tool (10) has an asymmetrically constructed workpiece positioning device (16) which runs on three guide rails (17, 18, 19). It comprises two carriages (20, 45) which are connected together by a workpiece carrier (31) that is mounted so as to be rotatable about the A axis. While the first carriage (20) serves for the longitudinal and rotary positioning of the workpiece carrier (31), the second carriage (45) is provided merely for supplementary weight support. This results in a mechanically slimline, low-weight structure with high positioning accuracy. High dynamic loadability and thus a high machining rate and particularly high vibration resistance is allowed.

15 Claims, 3 Drawing Sheets

Figure 1:
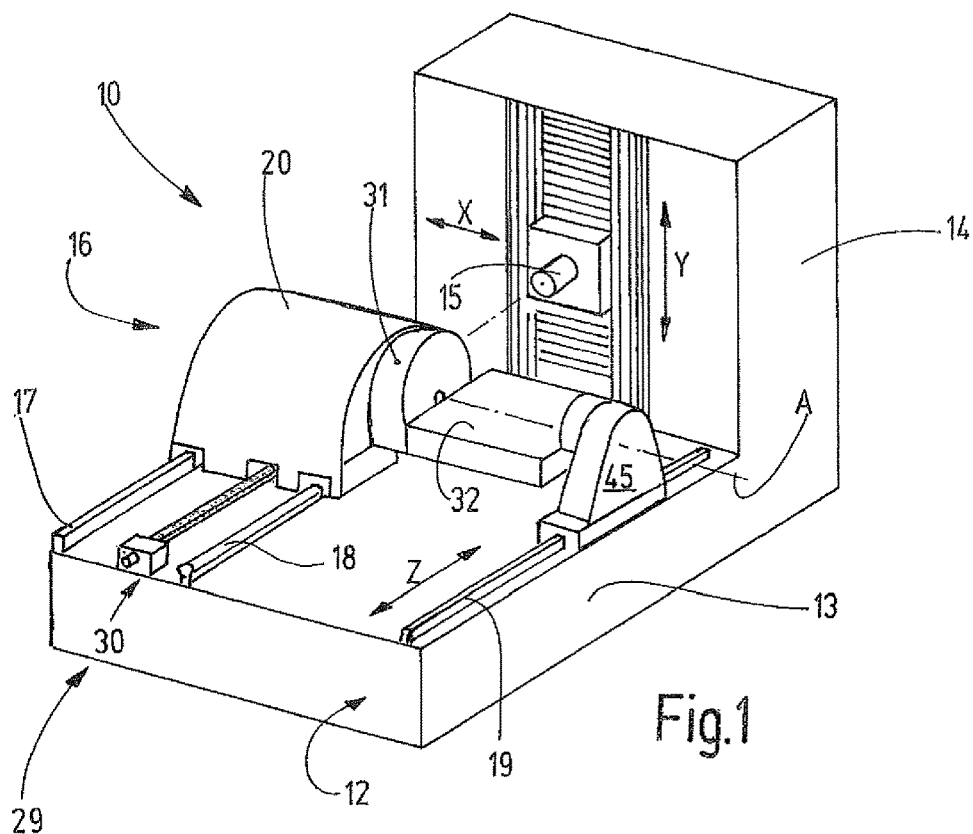

(58) Field of Classification Search
CPC ... B23Q 1/40; B23Q 1/42; B23Q 1/48; B23Q 1/66; B23Q 1/4852; B23Q 1/28; B23Q 1/285; B23Q 1/44; B23Q 7/00; B23Q 7/047; F16C 2322/39
USPC .... 29/281.1, 281.5; 269/55, 56, 58, 81, 136, 269/291, 60
See application file for complete search history.

(56) References Cited

U.S. PATENT DOCUMENTS

| | | | | |
|---|---|---|---|---|
| 6,155,716 | A | * | 12/2000 | Okamura ............... B23Q 1/017 384/48 |
| 7,645,103 | B2 | * | 1/2010 | Schmidt ................ B23Q 1/012 269/58 |
| 8,714,535 | B2 | * | 5/2014 | Jung .................. B23Q 11/0053 269/57 |
| 9,162,334 | B2 | | 10/2015 | Schuster |
| 2011/0275280 | A1 | | 11/2011 | Jywe et al. |

FOREIGN PATENT DOCUMENTS

| | | | |
|---|---|---|---|
| DE | 102 34 044 A1 | 2/2004 | |
| DE | 10 2012 201 736 B3 | 6/2013 | |
| DE | 10 2012 002 982 B4 | 1/2016 | |
| EP | 1362664 A2 * | 11/2003 | ............ B23Q 1/017 |
| JP | 2003-266257 | 9/2003 | |
| JP | 2004 299040 | 10/2004 | |

OTHER PUBLICATIONS

German Patent Office, Office Action—German Application No. 10 2015 119 646.8, dated Nov. 25, 2016, 6 pages (In German).
International Searching Authority, International Search Report—International Application No. PCT/EP2016/074994, dated Jan. 26, 2017, 9 pages (In German).
English Translation to Written Opinion for International Application No. PCT/EP2016/074994.
Written Opinion for International Application No. PCT/EP2016/074994.
Chinese Search Report for Application No. 2016800653433.

* cited by examiner

MACHINE TOOL HAVING A WORKPIECE CARRIER THAT IS DRIVEN ON ONE SIDE

The invention relates to a machine tool for machining, in particular for shape cutting, workpieces.

Machine tools typically comprise a workpiece positioning device for moving and positioning workpieces, as well as a tool receptacle by means of which the received tool can be imparted with a controlled driving and advance movement. The workpiece positioning device is disposed to transmit the weight of the workpiece and the machining forces acting on said workpiece to a machine bed. In doing so, a reliable and stiff workpiece support is of particular importance when high machining accuracy and quality are to be achieved. Referring to the basic generic concept of the machine tools of interest herein, the workpiece positioning device can be moved on a machine bed in a horizontal direction (moving direction). The working spindle for the machining tool can be moved horizontally, as well as—additionally—vertically, relative to the moving direction.

A machine based on this concept has been known from publication DE 10 2012 201 736 B3. This processing machine comprises three horizontally extending guide rails that are parallel to each other and are mounted to the machine bed for horizontally supporting and guiding the workpiece positioning device. The three rails are bridged by a carriage that is supported on each rail by two spaced apart rolling element revolving shoes, respectively, i.e., consequently by a total of six rolling element revolving shoes. A linear motor is arranged between a rail located on the outside and the center rail. This linear motor is closer to the outer rail than to the center rail. A chip channel is located between the other outer rail and the center rail, in which case the carriage of the workpiece table is located above said chip channel.

In this embodiment, a static agreement is given on the linear guides of the carriage.

Considering a modified embodiment, only two guide rails are arranged on the two sides of the linear motor, while the third guide rail beyond the chip channel described hereinabove is omitted. In this embodiment the workpiece is arranged horizontally on a projecting console and can be pivoted about a horizontal pivot axis.

In this embodiment a minimal stiffness of the freely projecting workpiece support is to be expected due to the flying one-sided bearing.

It is the object of the invention to state a machine tool that avoids the disadvantages of prior art.

This object is achieved with the machine tool according to claim 1.

The machine tool according to the invention comprises a machine bed with three guide rails extending parallel to each other, horizontally in a moving direction. Between a first guide rail located on the outside and the guide rail located in the middle, there is arranged a linear drive device that drives a first moving carriage. Preferably, the latter is only supported by the two guide rails adjacent to the linear drive device. Furthermore, the workpiece positioning device comprises a second moving carriage that is supported by the other, outer guide rail (the third guide rail). The connection between the first and the second moving carriages is provided by a workpiece carrier that is connected to a rotary drive device provided on the first moving carriage. This rotary drive device defines a horizontal pivot axis A extending transversely with respect to the moving direction. The workpiece carrier is also pivotally supported by the second moving carriage. During a movement of the first moving carriage in moving direction (Z-direction) the second moving carriage is taken along by means of the workpiece carrier.

The second moving carriage is disposed to vertically support the end of the workpiece carrier that is remote from the drive in order to inject weight and machining forces into the machine bed. Consequently, the machining accuracy and the machining quality can be increased. At the same time, a slim machine concept is accomplished, in which case the positioning drives of the workpiece positioning device are arranged so as to be concentrated on one side. Furthermore, this concept results in excellent accessibility to the workpiece, in particular in view of a workpiece change. The second moving carriage that is only passively dragged along in horizontal direction by the workpiece carrier runs only on one rail. It may be configured so as to have a smaller volume and is thus not in the way when the workpiece is changed.

By omitting one carriage bridging all three guide rails, there is no static overload. This is true in particular when the connection between the workpiece carrier and the second moving carriage displays less stiffness transversely with respect to the moving direction (horizontal) than in support direction (vertical). In order to increase the resilience transversely with respect to the moving direction, the bearing with which the workpiece carrier is mounted to the second moving carriage may display axial free travel. Additionally or alternatively, the workpiece carrier may comprise a section for the connection to the radial bearing, said section displaying a lower stiffness in a direction axial with respect to the pivot axis than in the transverse direction thereto. By employing this concept, it is possible to minimize inevitable forces acting on the guide rails and to attenuate tolerance specifications.

In comparison with other designs, the introduced machine concept results in a mass reduction for the entire workpiece positioning device of up to 30%. As a result of this, greater moving accelerations and greater rotational accelerations can be achieved. Alternatively, the affected drives may be designed more weakly, which, in turn leads to a reduction of weight and expense for technical features.

Rolling element revolving shoes are preferably used for the support of the two moving carriages on the guide rails. To do so, the first moving carriage preferably comprises, on the first and on the second guide rail, respectively, at least one, preferably two, rolling element revolving shoes. In plan view, they are preferably arranged in a quadrangle, as a result of which the first moving carriage is stiffly locked about its vertical yaw axis. Dynamic moments potentially occurring when starting up or decelerating the linear drive device, said moments acting about this yaw axis, are thus safely transmitted from the first and the second guide rails to the machine bed. The second moving carriage is supported by the third guide rail—for example, only via one rolling element revolving shoe—optionally also via several of these. This rolling element revolving shoe is disposed to absorb forces of weight.

The rolling element revolving shoes are preferably pretensioned so that they move without play on the guide rails. Preferably, this pretensioning of the rolling element revolving shoes of the first moving carriage is greater than the pretensioning of the rolling element revolving shoe of the second moving carriage. By pretensioning the rolling element revolving shoe of the second moving carriage to a lesser extent, its friction is reduced, as a result of which said latter carriage can follow the movement of the driven first moving carriage more accurately.

The second moving carriage may be provided with a locking device in order to hold the second moving carriage immovably in a stationary position. The locking device, for example, may be provided in front of or behind the rolling element revolving shoe of the second moving carriage in order to clamp the carriage—if needed and in a controlled manner—against the guide rail. Such a clamping device may be configured so as to be actuatable in a hydraulically, electrically, pneumatically or other manner.

By stationarily locking the second moving carriage, in particular by hydraulically clamping the clamping shoe to the guide rail, it is possible to further improve the stiffness of the workpiece support because then—while the workpiece is being machined—it is also possible to absorb forces in the direction of the guide rails. This enlarges the spectrum of machining operations that can be performed on the workpiece compared to those, wherein, in particular chronologically varying, for example vibrating, reaction forces act in Z-direction.

Preferably, the first moving carriage has, on the guide rails along the moving direction, a support width that is at least as large as the distance of the first guide rail from the second guide rail. This geometric configuration imparts the first moving carriage with particularly good directional stability that allows the workpiece table to be docked on one side and the second moving carriage to be dragged along, without any loss of accuracy.

The workpiece carrier is held on the first moving carriage, preferably via an axial/radial rolling bearing that is pretensioned in axial direction. On the other, opposite, side, the workpiece carrier is held on the second moving carriage by a radial bearing. Due to this concept, the first moving carriage can dispense with a second radial bearing as would be necessary with an overhung support of the workpiece carrier. This is true, in particular, of a connection of the workpiece carrier to the second moving carriage, said connection being stiff in vertical direction. This is accomplished by a connection between the workpiece carrier and the pivot joint of the second moving carriage in the form of a carrier that extends radially with respect to the pivot axis A.

Preferably, the linear drive device is arranged off-center between the first guide rail and the second guide rail. Further preferably, the linear drive device is closer to the inside second guide rail than the outside first guide rail. In doing so, the first moving carriage is eccentrically driven. Inasmuch as the linear drive is offset relative to the workpiece, this asymmetrical drive of the first moving carriage reduces—during acceleration or deceleration thereof—the existing moment about its yaw axis and thus the forces to be absorbed by the guide rails.

The weight and the geometric configuration of the first moving carriage of the workpiece carrier and the second moving carriage are preferably adjusted to each other in such a manner that, during each machining stage, there is a force acting on the second moving carriage directed at the third moving carriage. In doing so, the force of weight acting on the second moving carriage is such that it would not be overcome by an oppositely directed force in any machining state.

Furthermore, reaction moments occurring during the acceleration and deceleration of the first moving carriage are preferably transmitted via the first and the second guide rails to the machine bed. The second moving carriage is disposed only for also carrying, and thus supporting, the weight, however not for absorbing the accelerating forces and/or the accelerating moments. However, if said carriage is provided with a braking device (clamping device), it may additionally act to discharge machining forces into the machine frame.

Figure 2:
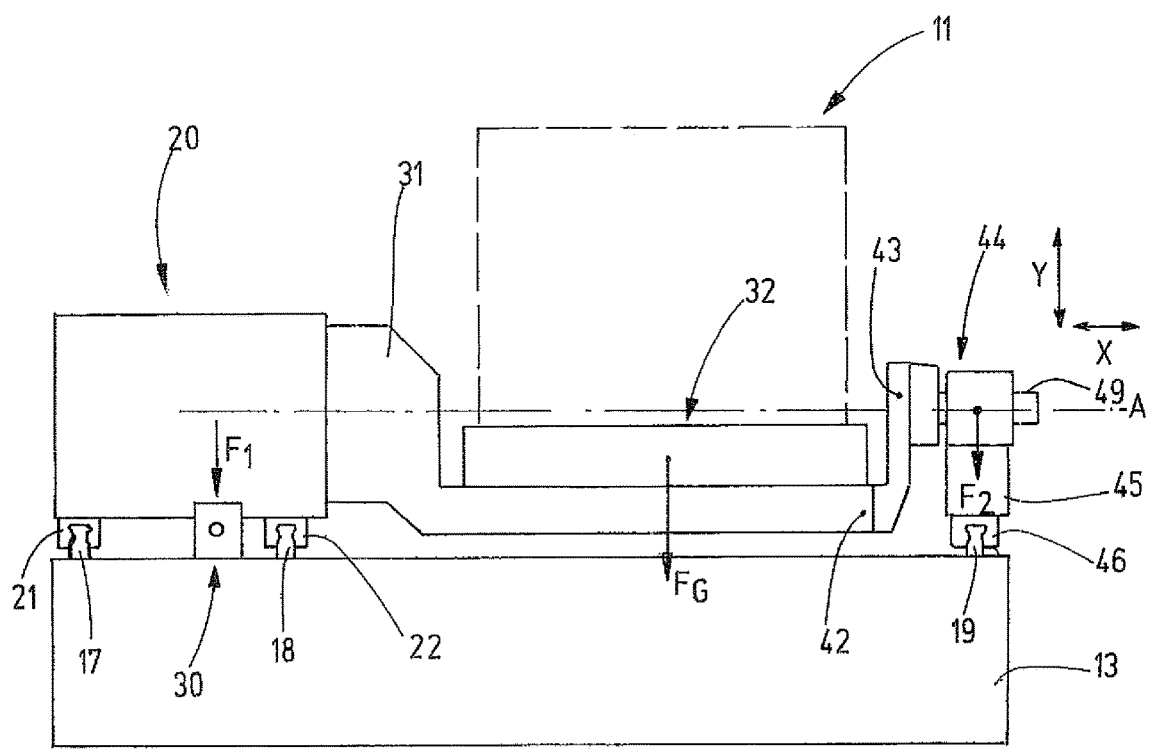
Figure 3:
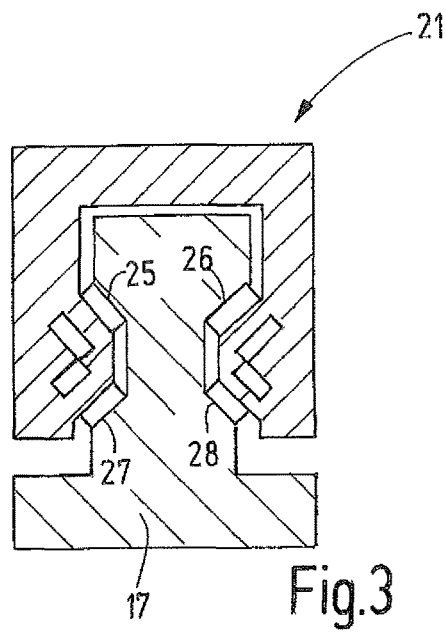
Figure 4:
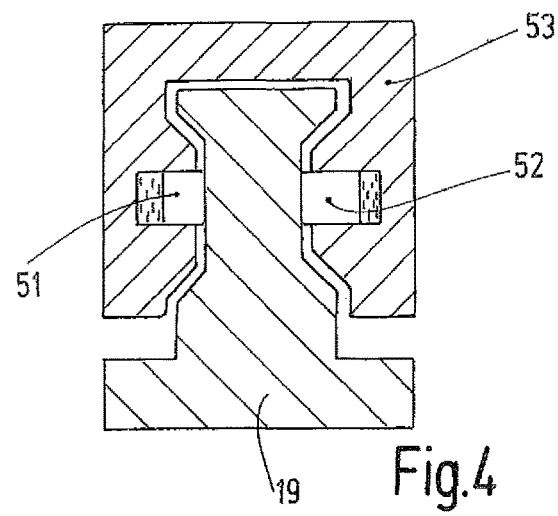
Figure 5:
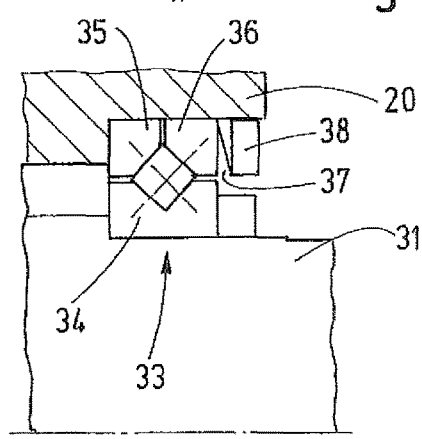
Figure 6:
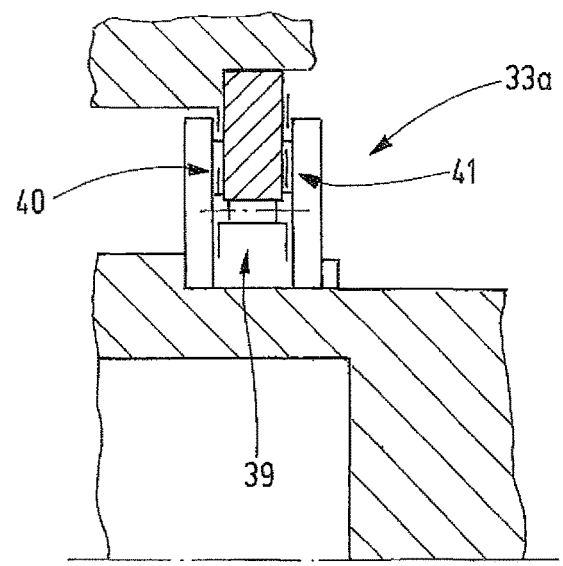
Figure 7:
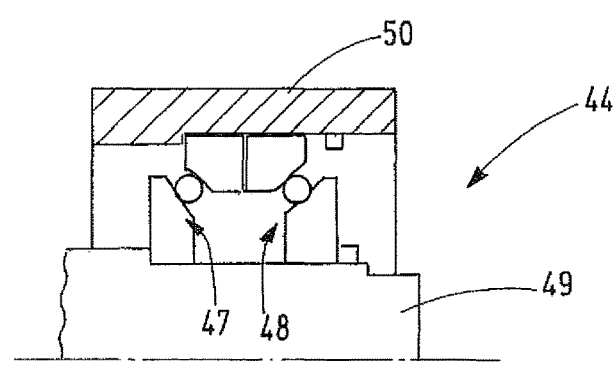
Figure 8:
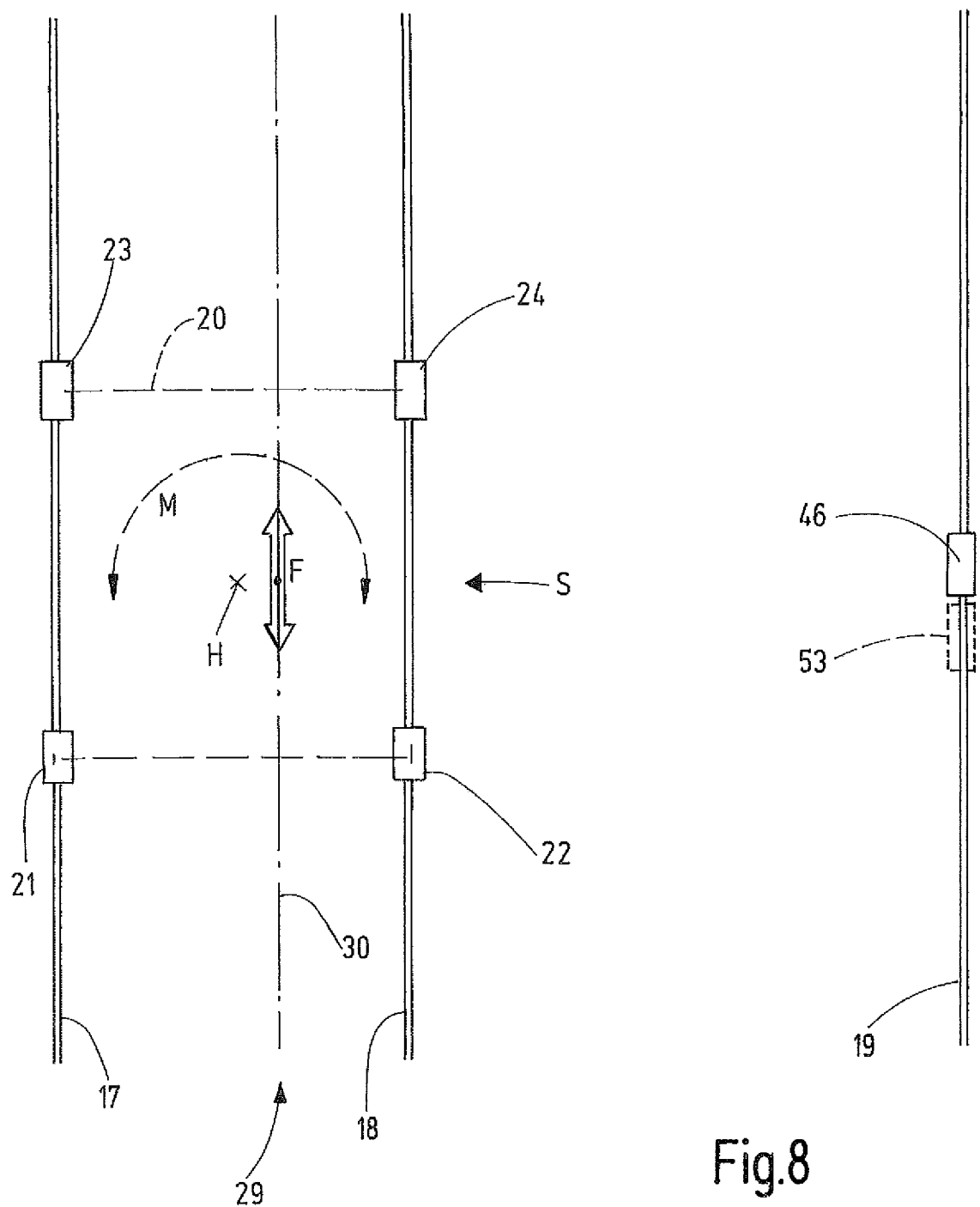

Additional details of advantageous embodiments of the invention are the subject matter of the description, the claims or the drawings. They show in FIG. 1 a schematized perspective view of a processing machine;

FIG. 2 a further schematized front view according to FIG. 1;

FIG. 3 a schematized cross-sectional view of a linear guide comprising a guide rail and a rolling element revolving shoe;

FIG. 4 a schematized cross-sectional view of a clampable shoe;

FIG. 5 a schematized longitudinal sectional view of a cross-roller bearing as is provided for the support of the workpiece carrier;

FIG. 6 a schematized longitudinal sectional view of an axial/radial rolling bearing in alternative embodiment of a cross-roller bearing;

FIG. 7 a schematized longitudinal sectional view of a bearing unit for supporting the workpiece carrier of the second moving carriage; and FIG. 8 a schematized plan view of the guide rails and the rolling element revolving shoes of the workpiece positioning device.

FIG. 1 shows a machine tool 10 that is disposed for shape cutting or other machining of workpieces. For illustration, a workpiece 11 is indicated schematically by dashed lines in FIG. 2. The machine tool 10 comprises a machine bed 12 that has a section 13 extending essentially horizontally and a part 14 extending upward therefrom. The upward-extending part 14 is provided with a rotatably driven working spindle 15 for the accommodation of a machining tool. The working spindle 15 can be moved in at least one direction, preferably two directions X and Y, extending at a right angle relative to each other, i.e., horizontally and vertically, by not specifically illustrated guiding and driving means. Additional moving options, tilting, inclining and pivoting options, as well as the possibility of the axial advance, may be provided.

The horizontal section 13 of the machine bed 13 carries a workpiece positioning device 16. This is disposed to move the workpiece 11 horizontally toward and away from the working spindle 15 in Z-direction und, furthermore, to rotate the workpiece—at least optionally—about a horizontal pivot axis A that is preferably oriented in transverse direction thereto and to hold the workpiece in the specified angular position.

In order to make moving the workpiece 11 in Z-direction possible, a total of three guide rails 17, 18, 19 are provided on or in the section 13 of the machine bed 12, said guide rails preferably being arranged in a common plane. The first and the second guide rails 17, 18 are arranged at a smaller distance from each other than the second guide rail 18 and the third guide rails 19. All three guide rails 17, 18, 19 are preferably oriented horizontally parallel to each other. It is also possible to arrange the guide rails 17, 18 in a first horizontal plane and the third guide rail 19 above said horizontal plane.

On the first guide rail 17 and the second guide rail 18, there is supported a first moving carriage 20 so as to be movable along the guide rails 17, 18. To do so, the moving carriage 20 is provided with at least two rolling element revolving shoes 21, 22 (FIG. 2) or—as can be inferred from FIG. 8—with a total of four such rolling element revolving shoes 21, 22, 23, 24. They bear the first moving carriage 20 and are preferably arranged at its corners in order to define a square or rectangular area, as is shown by FIG. 8, together with the moving carriage 20 represented by dashed lines.

The rolling element revolving shoes 21, 22, 23, 24 may be of any suitable design. According to the example of FIG. 3 it is shown as a rolling element revolving shoe 21 configured as a roller revolving shoe. This shoe comprises a total of four rolling element groups (rollers) on which the four tracks 25, 26, 27, 28 are arranged and to which are assigned return tracks. The rolling element revolving shoes 21, 22, 23, 24 may also extend over the entire length of the moving carriage 20 (or they may be arranged at spaced apart locations in moving direction). In any event, they define, on at least one of the two guide rails 17, 18, a length that is sufficient to absorb the occurring moments M about the yaw axis H (FIG. 8) and to discharge said moments via the respective rail 17 and/or 18 into the machine bed.

A linear drive device 29 is disposed for driving the moving carriage 20, said drive device being disposed for accelerating or decelerating the moving carriage 18 in Z-direction, i.e., along the guide rails 17, 18 that are arranged parallel to each other, as well as, furthermore, for accurately positioning said carriage and holding it in a specified position. Suitable drives are, in particular, position-controlled drives such as the spindle drive 30 shown as an example by FIGS. 1 and 2. Preferably, such a spindle drive is arranged between the guide rails 17, 18. As is particularly obvious from FIGS. 1 and 8, the spindle drive 30—indicated only symbolically by a chain line in FIG. 8—is arranged off-center. This chain line of the spindle drive 30 marks the axis of rotation of the spindle that is arranged at a distance from the guide rail 17 that is greater than the distance from the guide rail 18. Consequently, acceleration forces F are eccentrically introduced into and removed from the moving carriage 20.

A workpiece carrier 31 is supported by the moving carriage 20 so as to be pivotable about the horizontal axis of rotation A. The workpiece carrier 31 defines a workpiece mounting surface 32 that is located on or slightly below the axis of rotation A so that the axis of rotation A extends through the workpiece 11.

The workpiece carrier 31 is supported on the moving carriage 20 via an axial/radial rolling bearing 33, as can be inferred from FIG. 5, for example. The axial/radial rolling bearing 33 may be configured as a cross roller bearing with an inside ring 34 that comprises a triangular groove for cross-wise arranged bearing rollers. The latter have axes of rotation that alternate at a right angle relative to each other, said axes being indicated in a chain line in FIG. 5. The associate outer bearing part consists of two outside rings 35, 36 that may be tensioned relative to each other by a spring 37 and a nut 38. Alternatively, it is possible to provide a bearing configuration as in FIG. 6. The axial/radial rolling bearing 33a shown there comprises a radial bearing 39 and two axial bearings 40, 41 that are tensioned relative to each other. The axial bearings 40, 41 can be resiliently tensioned relative to each other by means that are not further illustrated.

On the end 42 (FIG. 2) of the workpiece carrier 31 remote from the first moving carriage 20, said workpiece carrier being connected via a section 43 to a pivot bearing 44 that is concentrically arranged relative to the axis A. The pivot bearing 44 is connected to a second moving carriage 45 that runs on the guide rail 19. To accomplish this, at least one rolling element revolving shoe 46 is provided (FIGS. 3 and 8). The rolling element revolving shoe 46 may be configured in the same manner as the rolling element revolving shoes 21 to 24. Preferably however it runs more smoothly than the latter, e.g., in that the rolling elements are held at a lower prestress. Whereas the rolling element revolving shoes 22, 24 of the first moving carriage 20 form a quadrangle with the rolling element revolving shoes 21, 23 of the first moving carriage, they preferably form an isosceles triangle with the rolling element revolving shoe 46 of the second moving carriage 45. In doing so, in particular the distance between the guide rails 18, 19 may be greater than the distance between the guide rails 17, 18. Likewise, the distance of the guide rails 18, 19 from each other may be greater than the distance between the faces of the rolling element revolving shoes 22, 24 that face away from each other. The configuration according to the invention allows the accommodation of space-occupying workpieces on a relatively small machine tool that requires only a small footprint.

It is also possible to provide a sliding shoe or a hydrostatic bearing instead of the rolling element revolving shoe 46. Such a bearing can have a narrow gap between the running track of the rail 19 and the corresponding guide surface of the bearing shoe, said gap being filled with a gaseous or liquid fluid. This represents an option displaying particularly low friction, wherein the second moving carriage 45 follows the first moving carriage 20 in a particularly precise manner.

The pivot bearing 44 is a radial bearing that first and foremost—preferably, however, exclusively—transmits radial forces. It may be configured consistent with a design as schematically indicated in FIG. 7. In particular, as is depicted, it may consist of two inclined roller bearings or inclined ball bearings 47, 48 that are disposed to rotatably support a pin 49 in a bearing housing. The outside rings of the rolling bearings 47, 48 can be supported in the bearing housing 50 so as to be axially shiftable.

Additionally or alternatively, the section 43 is preferably stiff in the direction transverse relative to the axis A, however slightly resilient along the axis A, i.e., it is made to be less stiff. The connection between the first moving carriage 20 and the second moving carriage 45 is accomplished only by the workpiece carrier 31, including the section 43 and, optionally, the pin 49. The second moving carriage 45 is not driven. Only the first moving carriage 20 is being driven. The second moving carriage 45 only acts as a support, in particular, for the force of weight $F_G$ of the workpiece 11, as well as the associate workpiece carrier 31, wherein this force of weight $F_G$ is distributed over the two moving carriages 20, 45 ($F_1$, $F_2$).

However, if necessary, the moving carriage 45 can be stationarily locked. To do so, a clamping shoe 53 that can be blocked in a controllable manner may be attached in front of or behind the rolling element revolving shoe. FIG. 4 shows an exemplary embodiment regarding this. The clamping shoe 53 shown there comprises one, preferably two oppositely located, brake shoes 51, 52 that hold the guide rails 19 clamped between them, said shoes being configured as hydraulic pistons or potentially being connected to such pistons in order to be subjected to pressure or be released as needed. A pressure line for loading the piston and the brake shoes 51, 52, respectively, with hydraulic fluid may extend through the workpiece carrier 31. An appropriate swivel coupling for fluid may be provided on the pivot bearing 44 in order to connect the fluid line of the workpiece carrier 31 to the rolling element revolving shoe 46.

The machine tool 10 described so far operates as follows:

In order to machine a workpiece 11, said workpiece is placed on the workpiece mounting surface 32 of the workpiece carrier 31. Inasmuch as the bearing housing 44 extends only slightly over the A-axis, the access to the workpiece mounting surface 32 is also easily possible from the side. Appropriate handling apparatus can transport the workpiece 11 almost unimpaired out of the Z-direction, as well as out of the X-direction, to and away from the workpiece carrier 31.

For machining, the moving carriage 20 is moved into a desired machining position. Via the workpiece carrier 31, said carriage carries along the second moving carriage 45. Preferably, the second moving carriage 45 runs with particularly low friction. For this purpose it may be provided, for example, with only one rolling element revolving shoe 46 that may additionally act with reduced roller prestress. Therefore, the second moving carriage 45 follows the first moving carriage 20 in a precise manner. When the desired Z-position has been reached, the linear drive device 29 blocks the continued advance of the first moving carriage 20. Thus, the second moving carriage 45 remains in its position. The force of weight of the workpiece 11 is distributed over both moving carriages 20, 45.

Referring to the embodiments with a locking device—provided that the workpiece is not to be moved in Z-direction—the brake shoes 51, 52 can be activated, as a result of which the second moving carriage 45 is locked in Z-position. This has the advantage that forces that also occur in Z-direction, said forces for example potentially being due to the machining of the workpiece, are absorbed by both moving carriages 20, 45 and discharged into the machine bed 13.

It is possible to pivot the workpiece 11 by means of a not specifically described pivot device during the machining process, or between individual machining steps, about the A-axis. In this case, any occurring acceleration forces are absorbed only by the first moving carriage 20 and discharged into the machine bed 13. In contrast, the pivot bearing 44 can always rotate freely.

If the workpiece 11 is to be moved in Z-direction, this is accomplished by the linear drive device 29 that accelerates and decelerates the first moving carriage 20. As a result of this, it is possible for moments M to occur, in particular when the center of mass S (see FIG. 8) of the total arrangement comprising the workpiece positioning device 16 and the workpiece 11 is located outside the center of the first moving carriage 20. For minimizing same, the linear drive device 29 of the rail 18 located on the inside is closer than the guide rail 17 located on the outside. Remaining or still occurring moments of force M are absorbed by the rolling element revolving shoes 21 to 24. In contrast, the rolling element revolving shoe 26 is disposed only to bear weight.

The machine tool 10 comprises an asymmetrically constructed workpiece positioning device 16 that runs on three guide rails 17, 18, 19. It comprises two moving carriages 20, 45 that are connected to each other by a workpiece carrier 31 so as to be rotatable about the A-axis. While the first moving carriage 20 is disposed for the longitudinal and rotational positioning of the tool carrier 31, the second moving carriage 45 is provided only for supplementary weight bearing.

This results in a mechanically slim, low-weight structure displaying high positioning accuracy. High dynamic loadability and thus a high machining rate and particularly high vibration resistance are made possible.

LIST OF REFERENCE SIGNS

| | |
|---|---|
| 10 | Machine tool |
| 11 | Workpiece |
| 12 | Machine bed |
| 13 | Section of machine bed |
| 14 | Part of machine bed |
| 15 | Working spindle |
| 16 | Workpiece positioning device |
| 17 | First Guide rail |
| 18 | Second guide rail |
| 19 | Third guide rail |
| 20 | First moving carriage |
| 21, 24, 46 | Rolling element revolving shoes |
| 25-28 | Tracks |
| M | Moment |
| H | Yaw axis |
| 29 | Linear drive device |
| 30 | Spindle drive |
| F | Force of acceleration |
| 31 | Workpiece carrier |
| 32 | Workpiece mounting surface |
| 33, 33a | Axial/radial rolling bearing |
| 34 | Inside ring |
| 35, 36 | Outside ring |
| 37 | Spring |
| 38 | Nut |
| 39 | Radial bearing |
| 40, 41 | Axial bearings |
| 42 | End |
| 43 | Section |
| 44 | Pivot bearing |
| 45 | Second moving carriage |
| 53 | Clamping shoe |
| 47, 48 | Inclined ball bearings |
| 49 | Pin |
| 50 | Bearing housing |
| 51, 52 | Brake shoes |

The invention claimed is:

1. A machine tool for workpiece machining by shape cutting comprising:
   a machine bed on which are arranged at least first, second and third guide rails arranged parallel to each other and extending horizontally in a moving direction;
   a workpiece positioning device arranged on the machine bed so as to be movable in the moving direction;
   a linear drive device arranged between the first and the second guide rails and connected to the workpiece positioning device in order to be movable in the moving direction;
   wherein the workpiece positioning device includes a first moving carriage supported on the first and the second guide rails so as to be movable, and a second moving carriage supported on the third guide rail so as to be movable, the first moving carriage being located above the first and the second guide rails and the second moving carriage being located above the third guide rail and a workpiece carrier located between the first moving carriage and the second moving carriage, the workpiece carrier supported so as to be rotatably movable between the first moving carriage and the second moving carriage about a horizontally oriented pivot axis in a direction transverse to the moving direction, wherein a connection between the first moving carriage and the second moving carriage is only provided by the workpiece carrier and movement of the first moving carriage in the moving direction causes movement of the second moving carriage in the moving direction on the third guide rail due to the connection between the first moving carriage and the second moving carriage by the workpiece carrier.

2. The machine tool according to claim 1, further comprising a plurality of rolling element revolving shoes, wherein two of said plurality of rolling element revolving shoes are for movably supporting the first moving carriage on the first and the second guide rails and at least one rolling element revolving shoe of said plurality of rolling element revolving shoes on the third guide rail for supporting the second moving carriage.

3. The machine tool according to claim 2, wherein each of the plurality of rolling element revolving shoes of the first moving carriage and the second moving carriage is pretensioned, such that a pretension on the second moving carriage is smaller than a pretension on the first moving carriage.

4. The machine tool according to claim 1, wherein the second moving carriage is guided so as to be lockable on the third guide rail.

5. The machine tool according to claim 2, further comprising a clamping shoe in front of or behind the at least one rolling element revolving shoe of the plurality of rolling element revolving shoes for supporting the second moving carriage, said clamping shoe comprising a clamping device acting effectively against the third guide rail.

6. The machine tool according to claim 1, wherein the first moving carriage displays a support width on the first and second guide rails in the moving direction that is at least as large as a distance of the first guide rail from the second guide rail.

7. The machine tool according to claim 1, wherein the workpiece carrier is supported on the first moving carriage by an axial/radial rolling bearing that is arranged concentrically with respect to the pivot axis.

8. The machine tool according to claim 7, wherein the axial/radial rolling bearing is elastically pretensioned in axial direction of the pivot axis.

9. The machine tool according to claim 1, wherein the workpiece carrier is supported on the second moving carriage by a radial bearing, said radial bearing being arranged concentric with respect to the pivot axis.

10. The machine tool according to claim 9, wherein the radial bearing is associated with an axial clearance in the direction of the pivot axis.

11. The machine tool according to claim 9, wherein the radial bearing has two counter-oriented inclined element bearings that are tensioned relative to each other.

12. The machine tool according to claim 9, wherein the workpiece carrier has a section for connection with the radial bearing, said section displaying less stiffness with respect to the pivot axis than transversely with respect thereto.

13. The machine tool according to claim 1, wherein the linear drive device is eccentrically arranged between the first guide rail and the second guide rail.

14. The machine tool according to claim 1, wherein the workpiece positioning device is configured such that in each machining state on the second moving carriage, there exists a force directed at one of the first, second, or third guide rails by a geometric configuration and weight of the first and second moving carriages that are adapted to each other and to the occurring machining forces in such a manner that, in each machining state on the second moving carriage, there exists a force directed at one of the first, second, or third guide rails.

15. The machine tool according to claim 1, wherein the workpiece positioning device is configured such that in each machining state on the second moving carriage, there exists a force directed at one of the first, second, or third guide rails by a geometric configuration and weight that are adapted to each other and to occurring acceleration forces in such a manner that, in each moving state, the occurring acceleration forces and acceleration moments are transmitted via the first and the second guide rails to the machine bed, while the weight of the workpiece positioning device and of the workpiece is transmitted via the first, second and third guide rails to the machine bed.

* * * * *